United States Patent

Aach et al.

Patent Number: 5,825,846
Date of Patent: Oct. 20, 1998

[54] NOISE REDUCTION IN AN IMAGE

[75] Inventors: Til Aach; Dietmar W. Kunz, both of Aachen, Germany

[73] Assignee: U.S. Philips Corporation, New York, N.Y.

[21] Appl. No.: 770,363

[22] Filed: Dec. 20, 1996

[30] Foreign Application Priority Data

Dec. 21, 1995 [EP] European Pat. Off. ............... 95203590

[51] Int. Cl.⁶ ..................................................... H05G 1/64
[52] U.S. Cl. ................................................. 378/98; 378/62
[58] Field of Search ............................... 378/62, 98, 901; 250/370.09

[56] References Cited

U.S. PATENT DOCUMENTS

| | | | |
|---|---|---|---|
| 5,327,242 | 7/1994 | Naimpally et al. | 348/606 |
| 5,461,655 | 10/1995 | Vuylsteke et al. | 378/62 |
| 5,671,264 | 9/1997 | Florent et al. | 378/98 |

FOREIGN PATENT DOCUMENTS

| | | |
|---|---|---|
| 0616465A2 | 9/1994 | European Pat. Off. |
| 0751483A1 | 1/1997 | European Pat. Off. |
| 0755023A1 | 1/1997 | European Pat. Off. |
| 4-170185A | 6/1992 | Japan |

*Primary Examiner*—David P. Porta
*Assistant Examiner*—David Vernon Bruce
*Attorney, Agent, or Firm*—Jack D. Slobod; Dwight H. Renfrew

[57] ABSTRACT

In a method of processing an image the image is divided in one or more blocks. Separate blocks are spatially frequency transformed in that pixel-values of the blocks are transformed into spectral coefficients. A noise level of the image is estimated and reduced spectral coefficients are derived from spectral coefficients and the estimated noise level. Pixel-values for a processed block are synthesized from the reduced spectral coefficients and the processed blocks are assembled into a processed image. The noise level is estimated from the image information within the image. Preferably, a few parameters relating to the circumstances under which the image was acquired are also taken into account for estimating the noise level.

20 Claims, 2 Drawing Sheets

NOISE REDUCTION IN AN IMAGE

BACKGROUND OF THE INVENTION

1. Field of the Invention

The invention pertains to a method of processing an image wherein spectral coefficients are derived from the image, a noise level of the image is estimated, reduced spectral coefficients are derived from said spectral coefficients, and the estimated noise level and a processed image is synthesized from said reduced spectral coefficients. The invention also relates to an image processing system including a block generator for dividing the image into several blocks and a transformer unit for deriving sets of spectral coefficients from said blocks, a noise estimator for estimating respective noise levels of said blocks, a noise attenuator for deriving sets of reduced spectral coefficients for said blocks from said spectral coefficients and said noise levels, a synthesizing unit for synthesizing processed blocks from respective sets of reduced spectral coefficients, and an assembler unit for assembling processed blocks into a processed image. The invention further relates to an x-ray examination apparatus includes an x-ray source for emitting an x-ray beam to form an x-ray image of an object to be examined, an x-ray detector to convert the x-ray image into an image signal and an image processing system of said kind for processing the image signal.

2. Description of the Related Art

Such a method of image processing and such an image processing system are known form the European patent application EP 0 616 465.

According to the known method of image processing, three-dimensional blocks of data samples are formed from a sequence of images. Such a three-dimensional block is in fact a sequence of corresponding blocks of a plurality of successive images. The three-dimensional blocks of data samples are transformed into three-dimensional blocks of time frequency spectrum coefficients. That is, the pixel-values of the successive images are transformed into a temporal spectral decomposition. The noise level is estimated from time frequency spectrum coefficients that correspond to data samples that should be stationary. Notably, time frequency spectrum coefficients that relate to blanking intervals in the composite video signal of the sequence of images are used for estimating the noise level.

Hence, the known method has as a drawback that a multitude of successive images is required to form a processed image in which noise is effectively reduced. Because the known method requires a sequence of images there is a time delay involved in the formation of a processed image in which noise is reduced. Typically at least eight images must be formed before the time frequency spectrum coefficients can be derived. Hence, at the desired image rate of 25 images per second a time delay of at least 280 ms occurs. Such a delay is unacceptable when x-ray fluoroscopy is used to support medical interventions. Moreover, effective noise reduction is achieved with the known method only when the noise level is independent of the signal level of the image. In particular, the known method is at best only very poorly suitable to reduce noise in an x-ray fluoroscopy images.

X-ray fluoroscopy involves irradiating a patient with an x-ray beam, preferably at a low-x-ray intensity, continually, or pulsed at a high pulse-rate, so as to form a succession of x-ray images. From such an x-ray image an electronic image signal is derived by an x-ray detector and the electronic image signal is fed to a monitor on which the image information in the x-ray image is displayed. In particular during a medical intervention the x-ray images are displayed at a very high rate of 25 to 30 images per second so as to be able to follow the motion of a catheter which is moved inside a patient. The known image processing method is too slow for forming images at a very high rate in which images noise is reduced. In particular the known image processing method is too slow to be used during medical interventions.

Furthermore, the known image processing method estimates the noise level without taking the signal-level into account. Hence, the known image processing method is not suitable to reduce noise that is signal dependent. In x-ray imaging, especially at low x-ray intensity, the noise is dominated by x-ray quantum shot noise which has a Poissonian nature. The noise level is thus dependent on the x-ray intensity, i.e. on the brightness values of the x-ray image, and hence the noise that is transferred into the image that is displayed is dependent on the brightness of the displayed image. Hence, a further cause why the known image processing method is not suitable to be applied in five images is required to form a processed image in which noise is effectively reduced. Moreover, effective noise reduction can be achieved with the known method only when the noise level is independent of the signal level of the image. In particular the known method is at best only very poorly suitable to reduce noise in an x-ray fluoroscopy images. Because the known method requires a sequence of images there is a time delay involved in the formation of a processed image in which noise is reduced. Typically at least eight images must be formed before the time frequency spectrum coefficients can be derived. Hence, at the desired image rate of 25 images per second a time delay of at least 280 ms occurs. Such a delay is unacceptable when x-ray fluoroscopy is used to support medical interventions.

X-ray fluoroscopy involves irradiating a patient with an x-ray beam, preferably at a low-x-ray intensity, continually, or pulsed at a high pulse-rate, so as to form a succession of x-ray shadow images. Each x-ray image is formed due to spatially varying x-ray absorption within the patient. These x-ray images are picked-up with an x-ray detector. From such an x-ray image an electronic image signal is derived by the x-ray detector and the electronic image signal is fed to a monitor on which the image information in the x-ray image is displayed. In particular during a medical intervention the x-ray images are displayed at a very high rate of 25 to 30 images per second so as to be able to follow the motion of a catheter which is moved inside a patient. The known image processing method is too slow for forming images at a very high rate in which images noise is reduced. In particular the known image processing method is too slow to be used during medical interventions.

Furthermore, the known image processing method estimates the noise level without taking the signal-level into account. Hence, the known image processing method is not suitable to reduce noise that is signal dependent. In x-ray imaging, especially at low x-ray intensity, the noise is dominated by x-ray quantum shot noise which has a Poissonian nature. The noise level is thus dependent on the x-ray intensity, i.e. on the brightness values of the x-ray image, and hence the noise that is transferred into the image that is displayed is dependent on the brightness of the displayed image. Hence, a further cause why the known image processing method is not suitable to be applied in one or more blocks and a transformer-unit for deriving spectral coefficients from pixel-values of the separate blocks, a noise estimator for estimating a noise level of the image, a noise attenuator for deriving reduced spectral coefficients from spectral coefficients and the noise level, a synthesizing unit for synthesizing pixel-values for a processed block from said reduced spectral coefficients and an assembler-unit for assembling processed blocks into a processed image in conjunction with x-ray fluoroscopy is that the known image processing method does not take the dependence of the noise level on the x-ray intensity into account.

SUMMARY OF THE INVENTION

An object of the invention is to provide a method of processing an image, is particular an x-ray image, which processing includes substantially reduces noise and which is fast enough to be suitable for noise reduction in high rate imaging.

This object is achieved by the method according to the invention which is characterized in that the noise level is estimated mainly from the image.

Because the noise level is derived from image information, notably represented by pixel-values of the image, the method according to the invention furnishes an accurate estimate of the noise level. Consequently, the method according to the invention effectively reduces noise in the image where the noise is signal dependent. Notably, the method according to the invention is suitable for effectively reducing x-ray quantum noise in the x-ray image. The image processing method yields a processed image having a high signal-to-noise ratio even in case the input image has a relatively low signal level. A further refinement in estimating the noise level is obtained when one or a few parameters pertaining to the conditions under which the image is formed are also taken into account, apart from image information of the image, are also taken into account.

Because the noise level is estimated from the image that is to be processed there is hardly any delay in the formation of the processed image. In particular there is no delay involved for producing a plurality of successive images. In case the image processing method of the invention is carried out on images of a sequence of images following one another in a rapid succession there is hardly any delay in the formation of the processed images as the processing is carried out on a frame-by-frame basis. Hence, the method of the invention is successful in reducing noise in an image that is formed at a high image rate, such as 25 to 30 images per second.

As x-ray quantum noise is the dominant noise component in an x-ray image formed with a low x-ray intensity and the method of the invention is suitable to be applied in conjunction with a high image rate, the image processing method of the invention is in particular successful in reducing noise in images that are formed by x-ray fluoroscopy that is performed either continually or at a high x-ray pulse rate. As noise is effectively reduced in x-ray fluoroscopy, the method is particularly attractive to be carried out when performing a medical intervention. Namely, the image processing method is able to produce images with a low noise level and a high signal-to-noise ratio in which the motion of a small object such as a catheter can made clearly visible.

When the image is divided into several blocks for which respective noise levels are estimated, differences in noise levels of separate blocks are taken into account. In particular even if in separate portions of the image the noise levels are different, the image processing method of the invention yields a processed image in which noise is effectively reduced while relevant image information is maintained. Furthermore, in separate blocks portions of image structure take up a relatively large portion of respective blocks although the image structure may take up a rather small portion of the entire image. As a consequence, in the spectral coefficients of separate blocks there is less mixing of image information with noise as a smaller blocksize is employed. On the other hand blocks should be sufficiently large to be able to contain substantial image structures. In practice suitable blocksizes are 32×32 or 64×64 pixels. As the blocks are processed independently of one another the blocks can be processed either in parallel or in series. In case a rapid succession of images is processed, the estimated noise level is preferably split into several contributions. A first contribution to the noise level pertaining to local properties of the image currently being processed and a second of the estimated noise level is varying slowly in time as a result of for example changing image acquisition circumstances. The second contribution may be set using a priori information of the imaging system and may be further accurately adjusted from simple statistical evaluation of the images being processed. As the second contribution appears in practice to vary only very slowly as compared to the first contribution, the statistical evaluation may be performed predominantly on the basis of earlier images of the succession that have already been processed so that such statistical evaluation does not imply any additional delay in the image processing.

A preferred implementation of a method for processing an image according to the invention is characterized in that the noise level is derived from average brightness values for separate blocks.

In many practical situations the noise level in separate blocks is strongly dependent on the average brightness in each block. From the average brightness an accurate estimate for the noise level is obtained without the need for complicated computations. In particular in x-ray fluoroscopy, the noise level is dominated by x-ray quantum shot noise. As x-ray quantum shot noise has a strong Poissonian character, the average brightness in each block provides an accurate estimate of the noise level. As the noise level is derived for separate blocks, from average brightness-values of each of these blocks, variations of the noise level within the image are taken into account. A further refinement is obtained in estimating the noise level when one or a few parameters pertaining to the conditions under which the image is formed are also taken into account. That is, imaging parameters that do not contain image information apart from the image information as represented by the average values of the blocks, are taken into account for even more accurately estimating the noise level.

In a further preferred implementation of a method of processing an image according to the invention, is characterized in that estimating the noise level involves computation of the statistical variances of the spectral coefficients and the reduced spectral coefficients are derived from said statistical variances and the spectral coefficients.

The statistical variance of each spectral coefficient constitutes an accurate approximation of the noise component of that spectral coefficient. Especially, the statistical variance is an accurate representation for fluctuations pertaining to noise in a situation where the noise is such that fluctuations that cause a very large deviation of pixel-values from an average value occur very seldomly. For example Gaussian distributed noise or Poissonian noise give rise to a noise level that is very accurately represented by a statistical variance. Moreover, the computation of the statistical variances the pixel-values of a relevant block of the image is comparatively uncomplicated.

A further preferred implementation of a method of processing an image according to the invention is characterized in that separate reduced spectral coefficients are computed by multiplying spectral coefficients by an attenuation function, having a range in the interval [0,1], of the ratio of said spectral coefficient and its statistical variance.

As spectral coefficients are reduced according to their respective ratios to their statistical variances, it is achieved that spectral coefficients that are very unlikely to pertain to image information are reduced much, while spectral coefficients that are likely to include image information are not reduced much, or not reduced at all. Thus, it is achieved to reduce noise, while retaining image information even of small details and even if such details have very little contrast with respect to their surrounding in the image.

A further preferred implementation of a method of processing an image according to the invention is in that the attenuation function is an increasing function.

The likelihood is larger that a spectral coefficient includes image information as the ratio of that spectral coefficient to its statistical variance is lower. As an increasing attenuation function is employed, it is achieved with high accuracy to reduce noise while retaining small details in the image.

In a further preferred implementation of a method of processing an image according to the invention, the spectral coefficients are obtained by discrete Fast Fourier transformation, discrete Cosine or Sine transformation, or a discrete Hartley transformation of pixel-values of the image. Such transformations for converting pixel-values into spectral coefficients are particularly suitable to be carried out digitally at a high computation speed. Moreover, such transformations can be carried out by hardware components that are nowadays generally available.

A further preferred implementation of a method of processing an image according to the invention is characterized in that before deriving spectral coefficients for a separate block, absolute values of pixel-values of a boundary region of said block are decreased.

The decrease of absolute values of pixel-values of boundary regions of separate blocks is termed 'windowing'. Windowing counteracts the introduction of spurious high-frequency components, this perturbation is generally termed 'spectral leakage'. Moreover, the windowing is preferably implemented so as to constitute a smooth transition in overlapping areas from one block to its neighbours. In particular windowing can be implemented by multiplying pixel-values in overlapping portions of blocks by a window-factor, which window-factors tend to zero for pixels at the boundary of overlapping areas. Moreover, preferably the window-factors pertaining to pixel-values in separate blocks which pixel-values relate to the same pixel in the complete image add-up to a constant. Preferably, the window-factors are tapered to zero in overlapping areas from one block to its neighbouring block and are chosen such that the window-factors relating to the same pixel in the complete image add up to unity. When these preferred window-factors are employed there are hardly any artifacts introduced when assembling the processed blocks.

In relation to windowing it is noted here that when an a discrete cosine transformation is used, windowing is not required to avoid spectral leakage. Therefore the overlap between blocks may be reduced as such overlap then only functions to reduce blocking artifacts. Such blocking artifacts stand out as perturbing edges in the processed image. Moreover, when a discrete cosine transforms is used the windowing is preferably performed immediately before assembling processed blocks into a processed image in order to avoid blocking artifacts being introduced during assembling the processed blocks into a processed image.

A further preferred implementation of a method of processing an image according to the invention is characterized in that for deriving the reduced spectral coefficients, a spatial distribution in the image of image information to which the spectral coefficients relate is taken into account.

This implementation allows to retain image information relating to a very elongate structure in the processed image even if having little contrast, while noise is reduced. This is achieved in that noise is distinguished from image information included in spectral coefficients that have large values in one or a few directions in the image, while noise gives rise to spectral coefficients that are substantially spatially uniformly distributed. Thus, the method according to the invention effectively reduces noise while retaining relevant image information.

In particular, spectral coefficients that correspond to a low signal-to-noise value but that are also corresponding to an elongate structure having a dominating direction are prevented from being attenuated. To this end for separate spatial frequencies local signal-to-noise ratios are computed as the squared ratio of the spectral coefficient to the noise level pertaining to the average brightness of the block at issue. Preferably, the noise level is multiplied by a factor that takes the transfer characteristic of the imaging system into account. In order to counteract high sensitivity to artifacts in the image, the local signal-to-ratios are clipped so that their values fall within a predetermined range. From the two-dimensional collection of (clipped) local signal-to-noise ratios one or several main directions are determined along which the local signal-to-noise values having relatively high values are concentrated. These main directions in the spatial frequency domain are associated with to directions in the image along which image structures extend. In particular, when a striking image structure extends horizontally in the image then there are strong variations of pixel values along vertical lines in the image. That is pixel-values $p_{nm}$ vary predominantly with the first index n, whereas it varies only very slowly with the second index m. Upon spatial frequency transforming such an image the spectral coefficients and thus the local signal-to-noise values $c_{ij}$ have relatively high values for the second index j having low values. In particular, local signal-to-noise values $c_{ij}$ have high values for j=0.

Said main directions are for example derived from a so-called 'inertia matrix' which has as its matrix elements weighted averages of local signal-to-noise values. The weights pertain to distances along the respective axes in the frequency domain of the local signal-to-noise ratio concerned. Such main directions correspond to the principal axes of the inertia matrix. Once the main directions are derived along which local signal-to-noise values with relatively high values are concentrated the distance in the frequency domain of local signal-to-noise ratios to the one or several main directions may be computed. Alternatively, one may calculate for separate local signal-to-noise ratios, the angle included between the line through the origin in the frequency domain and the position of the local signal-to-noise ratio and the line through the origin along the or one of said main directions. In order to avoid that local-signal-to noise at or close to the main directions are reduced too much, the reduced spectral coefficients are derived from the local signal-to-noise ratios taking into account the distance in the frequency domain between the local signal-to-noise ratio concerned and said one or several main directions. As an alternative said angle may be taken into account. Preferably, a spectral coefficient corresponding to a local signal-to-noise is decreased more as it is located further away from the main directions in order to derive a reduced spectral coefficient that retains image information although the corresponding local signal-to-noise ratio may be rather small.

The step of taking the spatial distribution in the image into account may also be advantageously employed separately from the step of estimating noise mainly from image information within the image.

Further objects of the invention are to provide an image processing system and an x-ray examination apparatus suitable for processing an image that is derived from an x-ray image which processing includes substantially reducing noise while substantially avoiding processing delay.

An image processing system according to the invention is characterized in that the noise estimator is arranged to estimate the noise level mainly from respective blocks, in particular from one or more local average brightness value of respective blocks.

Such an image processing system is in particular suitable to carry out the image processing method according to the invention. In a contemporary image processing system the functions of several parts such as the block generator, the transformer unit, the noise estimator, the noise attenuator and the synthesizing unit may be performed by a suitably programmed computer or by a specially designed (micro) processor.

An x-ray examination apparatus according to the invention is characterized in that the noise estimator is arranged to estimate the noise level mainly from image respective block signal, in particular from one or more local average signal levels of the image signal.

The x-ray examination apparatus is equipped with an image processing system for carrying out the method of image processing of the invention. In this x-ray examination apparatus the image processing system carries out the image processing method on the image signal that represents the x-ray image. In the processed image signal noise is reduced while image information on small details in the image is retained. In particular in x-ray images noise is dominated by x-ray quantum noise that is strongly dependent on the intensity of the x-rays. Consequently, an accurate estimate of the noise level of the image signal is derived from local average signal levels that represent local average brightness of the x-ray image. The local average signal levels represent average pixel-values of portions of the image that are substantially smaller than the entire image but which portions are sufficiently large to comprise a number of pixels being large enough to allow accurate computation of a local average. For example such portions comprise 32×32 or 64×64 pixels. The local average signal levels may be formed as the average signal levels of respective portions of the image signal pertaining to respective blocks. As an alternative the local average signal levels may be derived from a low-frequency component of the image signal.

A preferred implementation of an x-ray examination apparatus according to the invention is characterized in that the noise estimator is arranged to take imaging parameters into account for estimating the noise level.

In the x-ray image the noise is predominantly Poissonian x-ray quantum noise that can be accurately derived from the local intensities in the x-ray image. The transfer of local intensities in the x-ray image to local average signal levels in the electronic image signal may depend on the settings of various components of the x-ray detector system such as the format of the x-ray image intensifier and, at a fixed local average brightness, the noise level may be, albeit weakly, dependent on the settings of the x-ray source.

These and other aspects of the invention will be apparent from and elucidated with reference to the implementations and embodiments described hereinafter by way of example and with reference to the accompanying drawing.

BRIEF DESCRIPTION OF THE DRAWING

The drawing includes the following figures wherein.

DETAILED DESCRIPTION OF THE PREFERRED EMBODIMENTS

Figure 1:
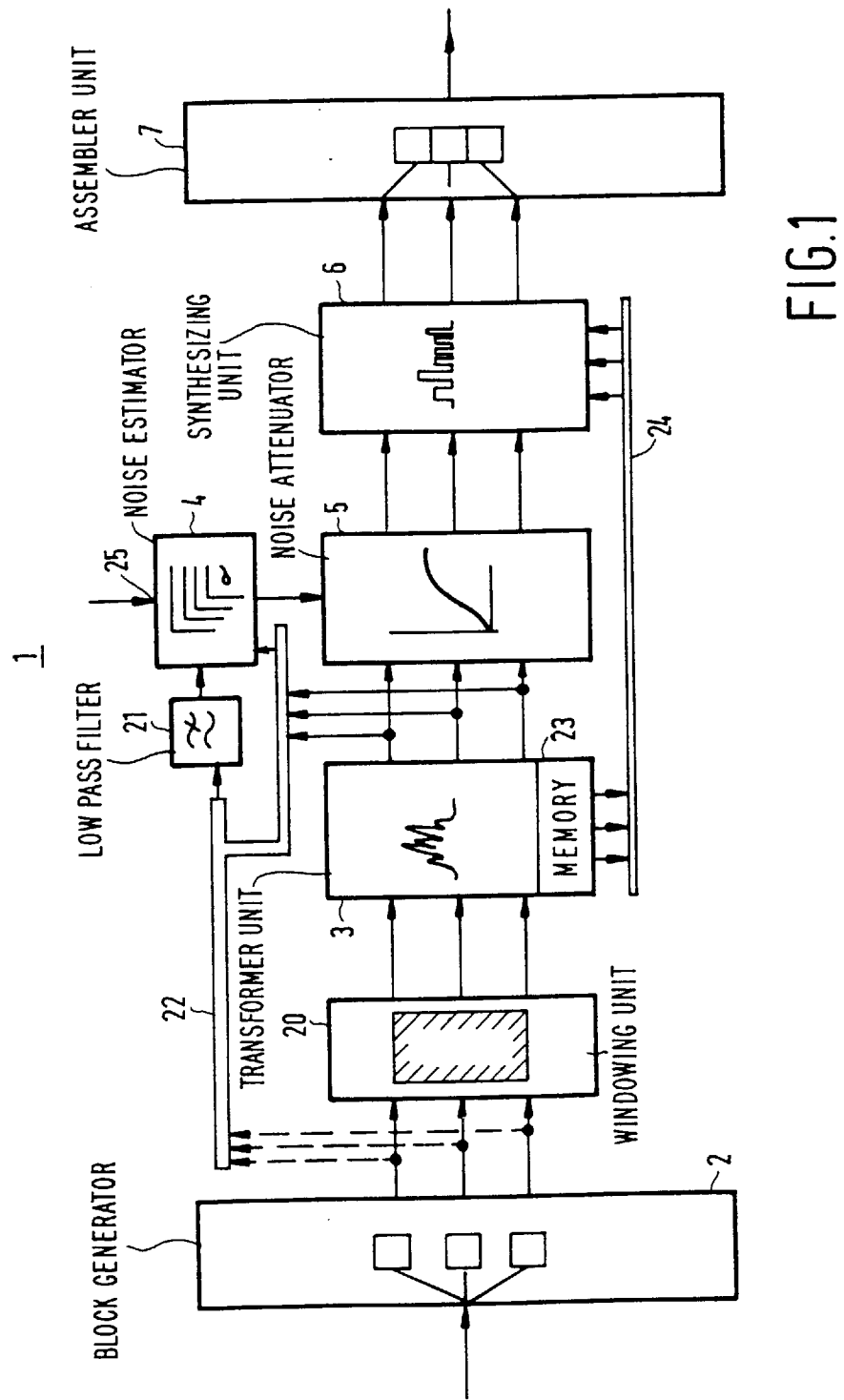
FIG. 1 shows a block diagram of an image processing system of the invention.

FIG. 1 shows a block diagram of an image processing system of the invention. An input image signal of which the signal levels represent image information is supplied to the block generator 2 which divides the image signal into block signals. Each of the block signals pertains to a block of e.g. 32×32 or 64×64 pixels in the image. The blocks may overlap over about half the dimension of a block or less. The separate block signals are fed to a windowing unit 20 which decreases the pixel-values of the edge portions of each block. Preferably, this decrease is achieved by multiplying pixel-values of each block by a window-factor that is a smooth function which decreases from 1 at the center of said block to a low value at the edge of the block. For example a triangular Bartlett window, a Hanning window having a cosine-like drop is quite smooth so that smaller overlaps are possible. Further details of such windows are known from the numerical mathematics handbook 'Numerical Recipes' by William H. Press et al. (Chapter 12.7). The windowing unit 20 supplies smoothed block signals to the transformer unit 3 that forms spectral coefficients form the windowed block signals. To that end a frequency transform such as a fast Fourier transform (FFT), a discrete cosine transform (DCT), a discrete sine transform (DST) or a discrete Hartley transform, is applied to the signal levels of the windowed block signals. In order to perform noise reduction the spectral coefficients that are computed by the transformer unit 3 are supplied to the noise attenuator 5. In particular the magnitudes of the spectral coefficients are supplied to the noise attenuator 5 to be reduced. The phases of the spectral coefficients are temporarily stored in a memory part 23 that is coupled to the transformer unit 3. Alternatively as is shown in FIG. 1, the memory part 23 may be incorporated in the transformer unit 3. In order to obtain the noise level in each of the blocks, the noise estimator 4 is provided to derive the noise level from the block signals. Preferably, a low-frequency component, of each block signal is fed to the noise estimator. The low-frequency components are preferably supplied by the transformer unit 3. To that end the transformer unit is coupled with its output to a bus 22 that is coupled to an input of the noise estimator 4. As an alternative a separate low-pass filter can be provided which is coupled to receive the block signals via the bus 22. Of course the low-pass filter may be formed by the combination of a high-pass filter that forms a high-frequency component of each block signal and that high-frequency component is subtracted from the corresponding block signal so as to furnish the low-frequency component. Preferably, the low-frequency component is the DC-component of the block signal at issue. The noise estimator is arranged for accurately obtaining the noise level of the block signals. For example when noise is dominated by Poissonian noise such as x-ray quantum noise the noise level can accurately be derived from the average brightness in the relevant block. In other words, for Poissonian noise the noise level is accurately obtained from the average signal level of the low-frequency component of the block signal at issue, that is of its DC-component.

The noise estimator 4 is preferably arranged to achieve a high processing speed. This is in particular done by limiting computational steps for estimating the noise level. To this end the noise estimator 4 is provided with a look-up table containing several sets of statistical variances for the spatial frequencies occurring in the frequency transforms of the blocks. Such a set of statistical variance values is in fact a noise spectrum which comprises values of the noise power as a function of spatial frequency. The sets of statistical variances are arranged according to values of the average signal level. Thus, when the noise estimator receives at an input a DC-component of a block signal it supplies at its output a set of statistical variance values corresponding to the noise level pertaining to the average brightness of the block at issue. Instead of storing a vast number of sets of statistical variance values only a few or even a single noise power spectrum may be stored that pertains to a reference value of the average brightness in a block. An accurate estimate for the noise level is obtained by multiplying the stored statistical variances with a scaling factor that depends on the deviation of the DC-component received at the input of the noise estimator from the reference value, e.g. the scaling factor may be derived from the ratio of the DC-component to the reference value. A further refinement is achieved by providing sets of statistical variances that pertain not only to the average brightness of the blocks but also to other imaging parameters such as the x-ray dose that is applied and/or the values of the voltage of the x-ray tube and the anode current of the x-ray tube. When the image processor is incorporated in an x-ray examination apparatus the parameter settings such as of the x-ray source and the x-ray detector are supplied to an external input 25 of the noise estimator 4 so that the noise estimator supplies statistical variance values that pertain to the conditions under which the image is formed.

Accurate values for the statistical variances stored in the look-up table of the noise estimator can be obtained from a set of one or more calibration images. In order to obtain these statistical variances the noise power spectrum may be measured by evaluating calibration images of extended objects of substantially uniform brightness. The dependence of the statistical variances on the x-ray intensity can be obtained by statistical evaluation of pixel-values of an image or even more accurately of a set of images. These images may be formed in a separate calibration step or by a second evaluation of the images that are to be processed. In the latter case one may make use of the fact that for fluoroscopy dose rates, most of the pixels of high-frequency components of the images are dominated by noise. More details of the function of a suitable noise estimator are described in the French patent applications, which corresponds to U.S. Pat. No. 5,671,264 and FR 95 088 93.

The noise attenuator 5 computes the ratio of the spectral coefficients to the noise level so as to form a local signal-to-noise ratio of each spectral coefficient, that is for each spatial frequency and each block. From the local signal-to-noise ratio reduced spectral coefficients are derived in such a way that high local signal-to-noise ratios are not much affected and that low local signal-to-noise ratios are substantially reduced. For example the reduced spectral coefficients are obtained from the corresponding local signal-to-noise ratio by applying an increasing function having [0,1] as its range and which saturates to unity for high values of the signal to-noise ratio and which tends towards zero for low values of the local signal-to-noise ratio. Particularly good results are obtained when a sigmoid attenuation characteristic, $1-\exp(-x^2)$, is used as the attenuation function. Only little computational effort is required when the attenuation function is stored in tabular form in a look-up table which may be incorporated in the noise attenuator 5. The reduced spectral coefficients are supplied to the synthesizing unit 6 together with the corresponding phase information from the memory part 23. The memory part 23 is coupled with the synthesizing unit 6 by way of a bus 24. Another possibility would be that the noise attenuator reduces both the real and imaginary part of the spectral coefficients in that both are multiplied with the same real attenuation factor. Then the phase is preserved during the derivation of the reduced spectral coefficients and hence it is not required to separate by supply the phase information to the synthesizing unit. From the reduced spectral coefficients and the phases the synthesizing unit 6 computes pixel-values having reduced noise for the relevant block. In this way the synthesizing unit 6 supplies processed blocks of pixel-values. By way of the assembler unit 7 these processed blocks are put together to form the processed image in which noise is reduced. The assembler unit 7 generates at its output an image signal having signal levels that represent pixel-values of the processed low-noise image.

Figure 2:
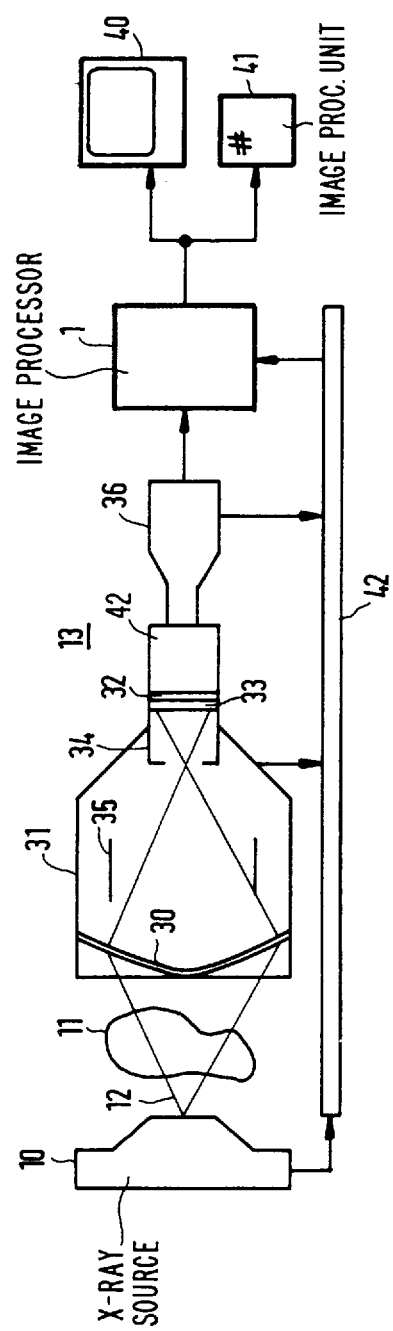
FIG. 2 shows a schematic representation of an x-ray examination apparatus of the invention.

FIG. 2 shows a schematic representation of an x-ray examination apparatus of the invention. The x-ray source 10 irradiates an object 11, notably a patient who is to be examined, with an x-ray -beam 12. Owing to local absorption of x-radiation within the patient an x-ray shadow image is formed on the detection face 30 of the x-ray detector 13. The x-ray detector derives an electronic image signal from the x-ray image. As an x-ray detector an image intensifier television chain as shown in FIG. 2 can be employed, but as an alternative an x-ray sensitive sensor matrix, a storage phosphor screen or an x-ray sensitive photoconductive layer, e.g. Se, can be used. Such an x-ray sensor matrix for example comprises a matrix of photodiodes in which due to absorption of x-rays, charges are formed that are stored in the self-capacitance of the photodiodes and that are read out through read-lines. The capacitances are preferably coupled to respective read-lines by way of thin-film transistors. The photodiodes may either be x-ray sensitive themselves or a the sensor matrix may be equipped with a scintillator layer of e.g. CsI:Tl for converting x-ray into visible light for which the photodiodes have a fair sensitivity. In case the x-ray image is recorded on a storage phosphor a scanning laser beam is employed to read out the x-ray image and in case an x-ray sensitive photoconductor, layer e.g. disposed on a drum, is used the charges in the layer that represent the brightness-values of the x-ray image are read out with an electrostatic scanning system. The x-ray detector system 13 as shown in FIG. 2 comprises an x-ray image intensifier 31 having an entrance screen 30 as the detection face. The entrance screen 30 converts incident x-radiation into an electron beam that is imaged by means of an electron optical system on an entrance window 32. The electron optical system comprises a photocathode that is incorporated in the entrance screen 30, a hollow anode 34 and control electrodes 35. On the exit window 32 there is disposed a phosphor layer 33. By absorption of electrons the phosphor layer emits light so that the electron beam generates a light-optical image on the exit window. The light-optical image is picked-up with a camera 36 which is optically coupled with the exit window 32 by means of an optical coupling, e.g. a lens system. The camera 36 supplies an electronic image signal of which signal levels represent brightness values of the light-optical image on the exit window. The electronic image signal is fed to the image processor 1 which reduces noise in the image and outputs a processed image signal to a monitor 40 and/or to an image processing system 41. On the monitor the image information of the x-ray image is displayed with a high diagnostic quality, i.e. having a good signal-to-noise ratio and in which image information of small details is retained. The image processing unit may perform further image processing such as storage or printing the processed image on a hard-copy. The x-ray source 10 with its high-voltage generator, the x-ray detector system 13 are coupled to the image processor 1 via a bus 42 so as to supply imaging parameters to the noise estimator 4 of the image processor 1. Thus, the noise estimator can supply an estimated noise level in accordance with the imaging conditions.

We claim:

1. Method of processing an image comprising deriving spectral coefficients from the image, estimating a noise level of the image, deriving reduced spectral coefficients from said spectral coefficients and the estimated noise level, and synthesizing a processed image from said reduced spectral coefficients, characterized in that the noise level of the image is estimated mainly from the image, and not from any other image.

2. A method of processing an image as claimed in claim 1, characterized in that before deriving the spectral coefficients for a separate block, absolute values of pixel-values of a boundary region of said block are decreased.

3. A method of processing an image as claimed in claim 1, characterized in that for deriving the reduced spectral coefficients, a spatial distribution in the image of image information to which the spectral coefficients relate is taken into account.

4. A method of processing an image as claimed in claim 1, characterized in that estimating the noise level involves computation of the statistical variances of the spectral coefficients, and the reduced spectral coefficients are derived from said statistical variances and the spectral coefficients.

5. A method of processing an image as claimed in claim 4, characterized in that before deriving the spectral coefficients for a separate block, absolute values of pixel-values of a boundary region of said block are decreased.

6. A method of processing an image as claimed in claim 1, characterized in that separate reduced spectral coefficients are computed by multiplying spectral coefficients by an attenuation function, having a range in the interval 0,1 of the ratio of said spectral coefficient and its statistical variance.

7. A method of processing an image as claimed in claim 6, characterized in that the attenuation function is an increasing function.

8. Method of processing an image comprising dividing the image into several blocks, and for separate blocks, deriving spectral coefficients, estimating a noise level, deriving reduced spectral coefficients from spectral coefficients and said noise level of the relevant block, synthesizing processed blocks from said reduced spectral coefficients, and assembling processed blocks into a processed image, characterized in that said noise levels are estimated mainly from respective blocks of the image, and not from any other image.

9. A method of processing an image as claimed in claim 8, characterized in that separate reduced spectral coefficients are computed by multiplying spectral coefficients by an attenuation function, having a range in the interval 0,1 of the ratio of said spectral coefficient and its statistical variance.

10. A method of processing an image as claimed in claim 8, characterized in that before deriving the spectral coefficients for a separate block, absolute values of pixel-values of a boundary region of said block are decreased.

11. A method of processing an image as claimed in claim 8, characterized in that estimating the noise level involves computation of the statistical variances of the spectral coefficients, and the reduced spectral coefficients are derived from said statistical variances and the spectral coefficients.

12. A method of processing an image as claimed in claim 11, characterized in that separate reduced spectral coefficients are computed by multiplying spectral coefficients by an attenuation function, having a range in the interval 0,1 of the ratio of said spectral coefficient and its statistical variance.

13. A method of processing an image as claimed in claim 8, characterized in that respective noise levels are derived from average brightness values of separate blocks.

14. A method of processing an image as claimed in claim 13, characterized in that before deriving the spectral coefficients for a separate block, absolute values of pixel-values of a boundary region of said block are decreased.

15. A method of processing an image as claimed in claim 13, characterized in that separate reduced spectral coefficients are computed by multiplying spectral coefficients by an attenuation function, having a range in the interval 0,1 of the ratio of said spectral coefficient and its statistical variance.

16. A method of processing an image as claimed in claim 13, characterized in that estimating the noise level involves computation of the statistical variances of the spectral coefficients, and the reduced spectral coefficients are derived from said statistical variances and the spectral coefficients.

17. A method of processing an image as claimed in claim 16, characterized in that separate reduced spectral coefficients are computed by multiplying spectral coefficients by an attenuation function, having a range in the interval 0,1 of the ratio of said spectral coefficient and its statistical variance.

18. An image processing system comprising:
   a block generator for dividing the image into several blocks;
   a transformer unit for deriving sets of spectral coefficients from said blocks;
   a noise estimator for estimating respective noise levels of said blocks;
   a noise attenuator for deriving sets of reduced spectral coefficients for said blocks from said spectral coefficients and said noise levels;
   a synthesizing unit for synthesizing processed blocks from respective sets of reduced spectral coefficients; and
   an assembler unit for assembling processed blocks into a processed image;
   characterized in that the noise estimator is arranged to estimate said noise levels mainly from respective blocks, in particular from one or more local average brightness values of respective blocks.

19. An x-ray examination apparatus comprising an x-ray detector for deriving an image signal from an x-ray image, and an image processing system for processing the image signal, the image processing system comprising:
   a block generator for dividing the image signal into block signals representing respective blocks;
   a transformer unit for deriving sets of spectral coefficients from respective block signals;

a noise estimator for estimating respective noise levels of said block signals;

a noise attenuator for deriving sets of reduced spectral coefficients for said blocks from spectral coefficients and said noise levels;

a synthesizing unit for synthesizing processed block signals from sets of reduced spectral coefficients, and an assembler unit for assembling processed block signals into a processed image signal;

characterized in that the noise estimator is arranged to estimate said noise levels mainly from respective block signals, in particular from one or more local average signal levels of respective block signals.

20. An x-ray examination apparatus as claimed in claim 19, characterized in that the noise estimator is arranged to take imaging parameters into account for estimating the noise.

* * * * *